(12) United States Patent
Yamaji et al.

(10) Patent No.: US 9,274,399 B2
(45) Date of Patent: Mar. 1, 2016

(54) OPTICAL MODULATOR

(71) Applicant: SUMITOMO ELECTRIC INDUSTRIES, LTD., Osaka (JP)

(72) Inventors: Kazuhiro Yamaji, Yokohama (JP); Katsumi Uesaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/281,204

(22) Filed: May 19, 2014

(65) Prior Publication Data

US 2014/0254974 A1 Sep. 11, 2014

Related U.S. Application Data

(63) Continuation-in-part of application No. 13/307,886, filed on Nov. 30, 2011, now Pat. No. 8,781,263.

(30) Foreign Application Priority Data

Nov. 30, 2010 (JP) ................................ 2010-267673

(51) Int. Cl.
*G02F 1/01* (2006.01)
*G02F 1/035* (2006.01)
*G02F 1/225* (2006.01)
*H04B 10/50* (2013.01)
*H04B 10/54* (2013.01)

(52) U.S. Cl.
CPC ............ *G02F 1/2255* (2013.01); *G02F 1/0123* (2013.01); *G02F 1/2257* (2013.01); *G02F 2201/121* (2013.01); *H04B 10/5053* (2013.01); *H04B 10/5057* (2013.01); *H04B 10/54* (2013.01)

(58) Field of Classification Search
CPC .............................. G02F 1/0134; G02F 1/2257
USPC ........................................................ 385/1–3
See application file for complete search history.

(56) References Cited

U.S. PATENT DOCUMENTS

| 5,801,861 | A | 9/1998 | Majima | |
|---|---|---|---|---|
| 2003/0138179 | A1* | 7/2003 | Akiyama et al. | 385/2 |
| 2003/0146440 | A1 | 8/2003 | Murata et al. | |
| 2011/0158576 | A1* | 6/2011 | Kissa et al. | 385/3 |
| 2011/0243491 | A1 | 10/2011 | Hashimoto | |

FOREIGN PATENT DOCUMENTS

| JP | 7-049473 A | 2/1995 |
|---|---|---|
| JP | 10-084166 A | 3/1998 |
| JP | 2003-229635 A | 8/2003 |
| WO | 2010/100489 A1 | 9/2010 |

OTHER PUBLICATIONS

Office Action dated Jul. 8, 2014, issued in corresponding Japanese Patent Application No. 2010-267673, with English Translation (8 pages).

* cited by examiner

*Primary Examiner* — Ryan Lepisto
(74) *Attorney, Agent, or Firm* — Westerman, Hattori, Daniels & Adrian, LLP

(57) ABSTRACT

A Mach-Zehnder optical modulator includes a join-and-branch portion; two light wave guides connected with the join-and-branch portion; an output light waveguide connected with the join-and-branch portion; arm electrodes respectively provided on the two light waveguides; and a ground electrode that is provided at an edge of at least one of the arm electrodes along the light waveguide, is spaced from the arm electrode and is grounded.

4 Claims, 12 Drawing Sheets

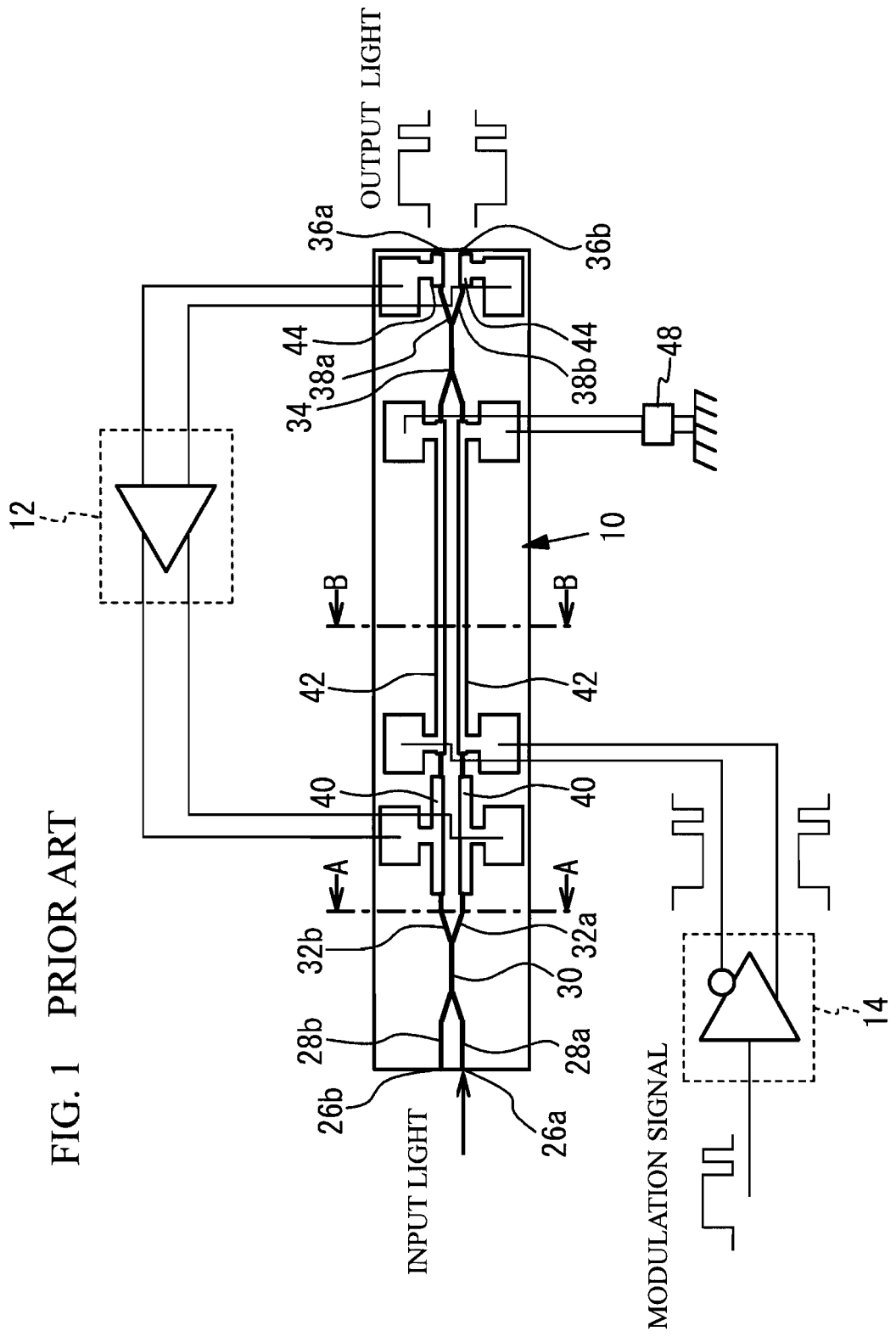

US 9,274,399 B2

OPTICAL MODULATOR

CROSS-REFERENCE TO RELATED APPLICATION

The present application is a CIP application of U.S. patent application Ser. No. 13/307,886 filed on Nov. 30, 2011.

BACKGROUND (i) Technical Field

A certain aspect of the embodiments discussed herein is related to an optical modulator (ii) Related Art In an optical communication system that superimposes a signal on a light and transmits the light with an optical fiber, an optical modulator that modulates the intensity of an laser light emitted from a light source, and generates an optical signal is used. For example, a Mach-Zehnder optical modulator is widely known as the optical modulator.

The Mach-Zehnder optical modulator has a branch potion that branches an input light, two light waveguides that propagate the branched lights, a multiplex portion that multiplexes the lights propagated through the light waveguides again, and an output light waveguide that leads the output light from the multiplexer portion to the outside of the modulator. There are provided a modulation electrode and a phase adjustment electrode on the two light waveguides that propagate the branched lights. The interference condition in multiplexing is changed by a voltage applied to the modulation electrode, whereby the light output is turned on and off. The phase adjustment electrode is used to set the phase difference between the lights on the two waveguides to a predetermined value.

There is a case where a light intensity detection electrode for detecting the light intensity is provided on the output light waveguide, which follows the multiplex portion. A voltage applied to the phase adjustment electrode is feedback controlled on the basis of the detection result of the light intensity detection electrode, so that the phase adjustment can be performed accurately (see Japanese Patent Application Publication No. 7-49473).

The conventional optical modulator has the following problem to be solved. The voltage applied to the phase adjustment electrode or the modulation electrode results in a leakage current that flows through a cladding layer between the phase adjustment or modulation electrode and the light intensity detection electrode. The leakage current affects the feedback control of the phase adjustment.

SUMMARY

According to an aspect of the present invention, there is provided a Mach-Zehnder optical modulator including: a join-and-branch portion; two light wave guides connected with the join-and-branch portion; an output light waveguide connected with the join-and-branch portion; arm electrodes respectively provided on the two light waveguides; and a ground electrode that is provided at an edge of at least one of the arm electrodes along the light waveguide, is spaced from the arm electrode and is grounded.

BRIEF DESCRIPTION OF THE DRAWINGS

FIG. 1 is a plan view of an optical modulation apparatus according to a first comparative example;

DETAILED DESCRIPTION

Figure 2A:
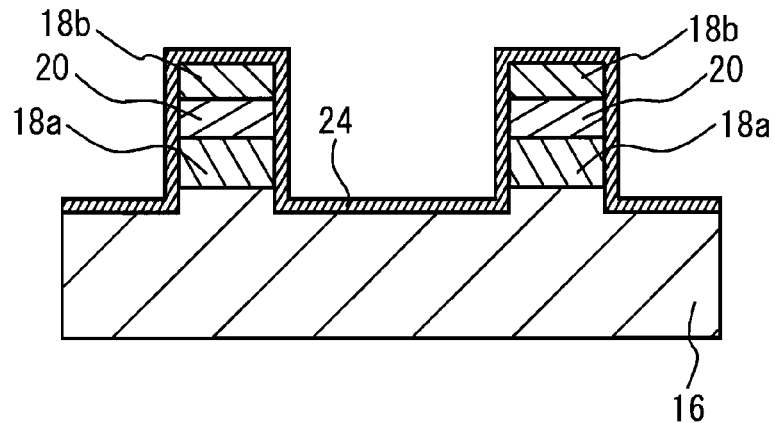
FIGS. 2A and 2B are cross-sectional views of the first comparative example.

First, a description will be given of an optical modulation apparatus according to a first comparative example.

FIG. 1 is a plan view of an optical modulation apparatus according to a first comparative example. As illustrated in FIG. 1, the optical modulation apparatus according to the first comparative example mainly includes a Mach-Zehnder optical modulator 10, a phase adjustment circuit 12, and a drive circuit 14. The phase adjustment circuit 12 applies DC voltages to phase adjustment electrodes 40. The drive circuit 14 applies modulation voltages to modulation electrodes 42.

Figure 2B:
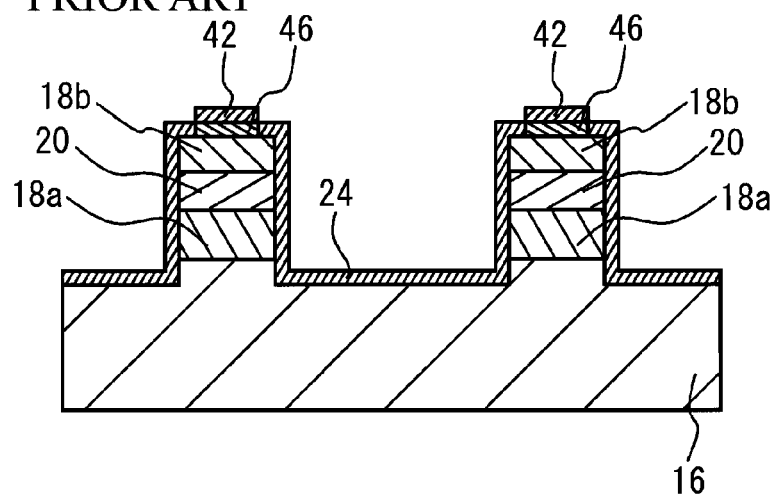

The Mach-Zehnder optical modulator 10 is configured by combining routes of mesa-shaped light waveguides on a semiconductor substrate. FIG. 2A is a schematic cross-sectional diagram taken along a line A-A depicted in FIG. 1, and FIG. 2B is a schematic cross-sectional diagram taken along a line B-B depicted in FIG. 1.

As illustrated in FIG. 2A, the light waveguides are formed on a semiconductor substrate 16. Each waveguide has a structure in which a lower cladding layer 18a, a core 20, and an upper cladding layer 18b are stacked in a mesa shape on the semiconductor substrate 16 in this order. An insulating film 24 is stacked on an upper surface of the semiconductor substrate 16 and an upper surface and side surfaces of each waveguide in this order.

The semiconductor substrate 16 is made of a semiconductor such as InP, for example. The lower cladding layer 18a and the upper cladding layer 18b are made of a semiconductor such as InP, for example. The core 20 is made of a semiconductor, such as InGaAsP for example, having band-gap energy smaller than the lower cladding layer 18a and the upper cladding layer 18b. Thereby, the light passing through the core 20 is confined with the lower cladding layer 18a and the upper cladding layer 18b. The insulating film 24 is made of a semiconductor such as SiN, for example.

As illustrated in FIG. 1, a first input light waveguide 28a connected to a first input end 26a, and a second input light waveguide 28b connected to a second input end 26b are provided in the Mach-Zehnder optical modulator 10. The first input light waveguide 28a and the second input light waveguide 28b join together at a first MMI (Multi Mode Interference) 30, and branch to a first light waveguide 32a and a second light waveguide 32b. When a longitudinal direction of the Mach-Zehnder optical modulator 10 is assumed as an axis of symmetry, the first light waveguide 32a is arranged at the same side as the first input end 26a, and the second light waveguide 32b is arranged at the same side as the second input end 26b.

The first light waveguide 32a and the second light waveguide 32b join together at a second MMI 34 serving as a join-and-branch portion, and branch to a first output light waveguide 38a connected to a first output end 36a and a second output light waveguide 38b connected to a second output end 36b. When the longitudinal direction of the Mach-Zehnder optical modulator 10 is assumed as the axis of symmetry, the first output end 36a is arranged at the same side as the second light waveguide 32b, and the second output end 36b is arranged at the same side as the first light waveguide 32a. Between a light path length of the first light waveguide 32a and a light path length of the second light waveguide 32b, a difference is provided beforehand. For example, a light-path-length difference that adds the phase difference of $-\pi/2$ to the lights propagated in the first light waveguide 32a and the second light waveguide 32b is provided.

The first light waveguide 32a and the second light waveguide 32b are called arms, which are provided with arm electrodes. The arm electrodes are those for controlling the phases of the arms. As a typical example, the arm electrodes are composed of the phase adjustment electrodes 40 and the modulation electrodes 42. The phase adjustment electrodes 40 and the modulation electrodes 42 are spaced apart from each other. Although the phase adjustment electrodes 40 and the modulation electrodes 42 are not limited to a particular positional relationship, in the present embodiment, the phase adjustment electrodes 40 are closer to the light input end than the modulation electrodes 42. Light intensity detection electrodes 44 for detecting the intensity of the lights propagated in the first output light waveguide 38a and the second output light waveguide 38b are provided on the first output light waveguide 38a and the second output light waveguide 38b, respectively.

As illustrated in FIG. 2B, each of the modulation electrodes 42 is arranged on the upper cladding layer 18b via a contact layer 46. The contact layers 46 are made of a semiconductor such as InGaAs, for example. The insulating film 24 is not provided between the upper cladding layers 18b and the contact layers 46. Similarly, the phase adjustment electrodes 40 and the light intensity detection electrodes 44 are also arranged on the upper cladding layers 18b via the contact layers 46. The phase adjustment electrodes 40, the modulation electrodes 42 and the light intensity detection electrodes 44 are made of metal such as Au, for example.

Referring again to FIG. 1, modulation voltages for modulating the lights propagated in the first light waveguide 32a and the second light waveguide 32b are applied to one end of each of the modulation electrodes 42 with the drive circuit 14. A termination resistor 48 is connected to the other end of each of the modulation electrodes 42. When the modulation voltages are applied to the modulation electrodes 42, a refractive index of the core 20 changes in the first light waveguide 32a and the second light waveguide 32b, and the phases of the lights passing through the first light waveguide 32a and the second light waveguide 32b change.

The drive circuit 14 applies differential signals as the modulation signals to the modulation electrode 42 provided on the first light waveguide 32a and the modulation electrode 42 provided on the second light waveguide 32b. That is, when a voltage for driving at H (high) is applied to the modulation electrode 42 of the first light waveguide 32a, a voltage for driving at L (low) is applied to the modulation electrode 42 of the second light waveguide 32b. On the contrary, when the voltage for driving at L (low) is applied to the modulation electrode 42 of the first light waveguide 32a, the voltage for driving at H (high) is applied to the modulation electrode 42 of the second light waveguide 32b. Thus, since a difference in potential exists between the voltages applied to the modulation electrode 42 of the first light waveguide 32a and the modulation electrode 42 of the second light waveguide 32b, the phase difference according to the difference in potential is added to the lights propagated in the first light waveguide 32a and the second light waveguide 32b.

For example, when the voltage for driving at H (high) is applied to the modulation electrode 42 of the first light waveguide 32a and the voltage for driving at L (low) is applied to the modulation electrode 42 of the second light waveguide 32b, a phase difference of $-\pi/2$ is added to the lights propagated in the first light waveguide 32a and the second light waveguide 32b. In addition, for example, when the voltage for driving at L (low) is applied to the modulation electrode 42 of the first light waveguide 32a and the voltage for driving at H (high) is applied to the modulation electrode 42 of the second light waveguide 32b, a phase difference of $+\pi/2$ is added to the lights propagated in the first light waveguide 32a and the second light waveguide 32b.

As described above, the phase shift that adds the phase difference of $-\pi/2$ to the lights propagated in the first light waveguide 32a and the second light waveguide 32b is provided in the first light waveguide 32a in advance. Therefore, when the modulation voltages applied to the modulation electrodes 42 result in a phase difference of $-\pi/2$ between the lights passing through the first light waveguide 32a and the second light waveguide 32b, a phase difference of $-\pi$ is developed between the light having passed through the first light waveguide 32a and the light having passed through the second light waveguide 32b. When a phase difference of $-\pi$ is developed between the light having passed through the first light waveguide 32a and the light having passed through the second light waveguide 32b, the light input via the first input end 26a is output via the first output end 36a and is not output via the second output end 36b. On the contrary, when the modulation voltages applied to the modulation electrodes 42 result in a phase difference of $+\pi/2$ between the lights passing through the first light waveguide 32a and the second light waveguide 32b, the phase difference between the light having passed through the first light waveguide 32a and the light having passed through the second light waveguide 32b is zero. When the phase difference between the light having passed through the first light waveguide 32a and the light having passed through the second light waveguide 32b is zero, the light input from the first input end 26a is output from the second output end 36b and is not output from the first output end 36a.

Thus, the output end from which the light input from the first input end 26a is output is switched between the first output end 36a and the second output end 36b, according to the phase difference between the lights having passed through the first light waveguide 32a and the second light waveguide 32b. Thereby, an output light signal from the first output end 36a or the second output end 36b can be used as a modulation signal. In the following description, it is assumed that the output light signal from the first output end 36a is used as the modulation signal.

When the light waveguides of the Mach-Zehnder optical modulator 10 are manufactured, manufacture variation may occur in the width and the length of the light waveguides in no small part, and the light path lengths of the first light waveguide 32a and the second light waveguide 32b may deviate from a preset value. Thereby, the phase difference between the lights having passed through the first light waveguide 32a and the second light waveguide 32b may deviate from a preset value. A circuit performing the phase adjustment in order to adjust such deviation or shift of the phase difference is the phase adjustment circuit 12.

The phase adjustment circuit 12 applies a DC voltage which is a phase control signal to each phase adjustment electrode 40, changes the refractive index of the core 20 in the first light waveguide 32a and the second light waveguide 32b, and changes the phases of the lights propagated in the first light waveguide 32a and the second light waveguide 32b to perform the phase adjustment. Specifically, the phase adjustment circuit 12 performs a feedback control of the DC voltage applied to each phase adjustment electrode 40, based on light intensity detected with each light intensity detection electrode 44. The output light waveguides 38 located below the light intensity detection electrodes 44 function as waveguide type photodiodes. The lights passing through the output light waveguides 38 are converted to currents $I_{PD}$, which are detected by ammeters, so that the light intensities can be detected. In a case where the phase difference between the light after passing through the first light waveguide 32a and the light after passing through the second light waveguide 32b is zero or $-\pi$, the intensity of the light output from the first output end 36a and the intensity of the light output from the second output end 36b are the same as each other at constant time intervals. Therefore, the phase adjustment circuit 12 adjusts the DC voltage to be applied to each phase adjustment electrode 40 so that the light intensity detected with the light intensity detection electrode 44 of the first output light waveguide 38a and the light intensity detected with the light intensity detection electrode 44 of the second output light waveguide 38b are the same as each other. Thereby, the phase difference between the lights having passed through the first light waveguide 32a and the second light waveguide 32b can be zero or $-\pi$, and the deviation or shift of the phase difference by the manufacture variation can be corrected.

In order to perform the above feedback control accurately, it is preferable to improve the detection accuracy of the light intensity by the light intensity detection electrodes 44. However, such improvement in the detection accuracy may encounter a problem of a leakage current between the light intensity detection electrodes 44 and the modulation electrodes 42. This is now described below.

Figure 3:
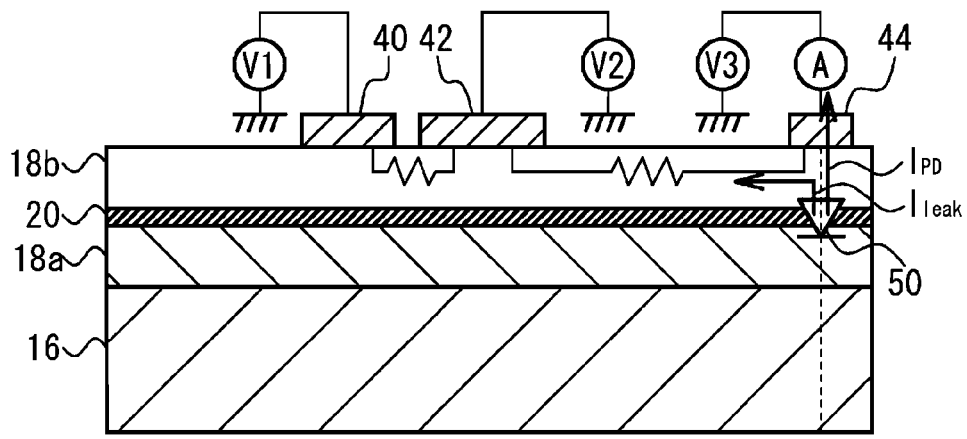
FIG. 3 is another cross-sectional view of the first comparative example.

FIG. 3 is a cross-sectional view of the optical modulator of the first comparative example taken along one of the light waveguides. In FIG. 3, parts that are the same as those illustrated in FIGS. 1 and 2 are given the same reference numerals, and a detailed description thereof is omitted here. In FIG. 3, an illustration of hatching that should be added to the upper cladding layer 18b and an illustration of cladding layers below the electrodes (the phase adjustment electrode 40, the modulation electrode 42 and the light intensity detection electrode 44) are omitted.

The electrodes formed on the upper cladding layer 18b are connected to voltage sources having mutually different voltages. More particularly, the phase adjustment electrode 40 is connected to a first voltage source V1 that supplies a first voltage V1. The modulation electrode 42 is connected to a second voltage source V2 that supplies a second voltage V2. The light intensity detection electrode 44 is connected to a third voltage source V3 that supplies a third voltage V3. Due to a potential difference (V2–V3) between the modulation electrode 42 and the light intensity detection electrode 44, a leakage current $I_{leak}$ may flow between the electrodes 42 and 44. The magnitude of current actually measured by an ammeter A is $|I_{PD}-I_{leak}|$, and includes an error amounting to the leakage current. Therefore, the feedback control of the phase adjustment may not be performed accurately. According to an aspect of embodiments described blow, the above problem is solved.

First Embodiment

Figure 4:
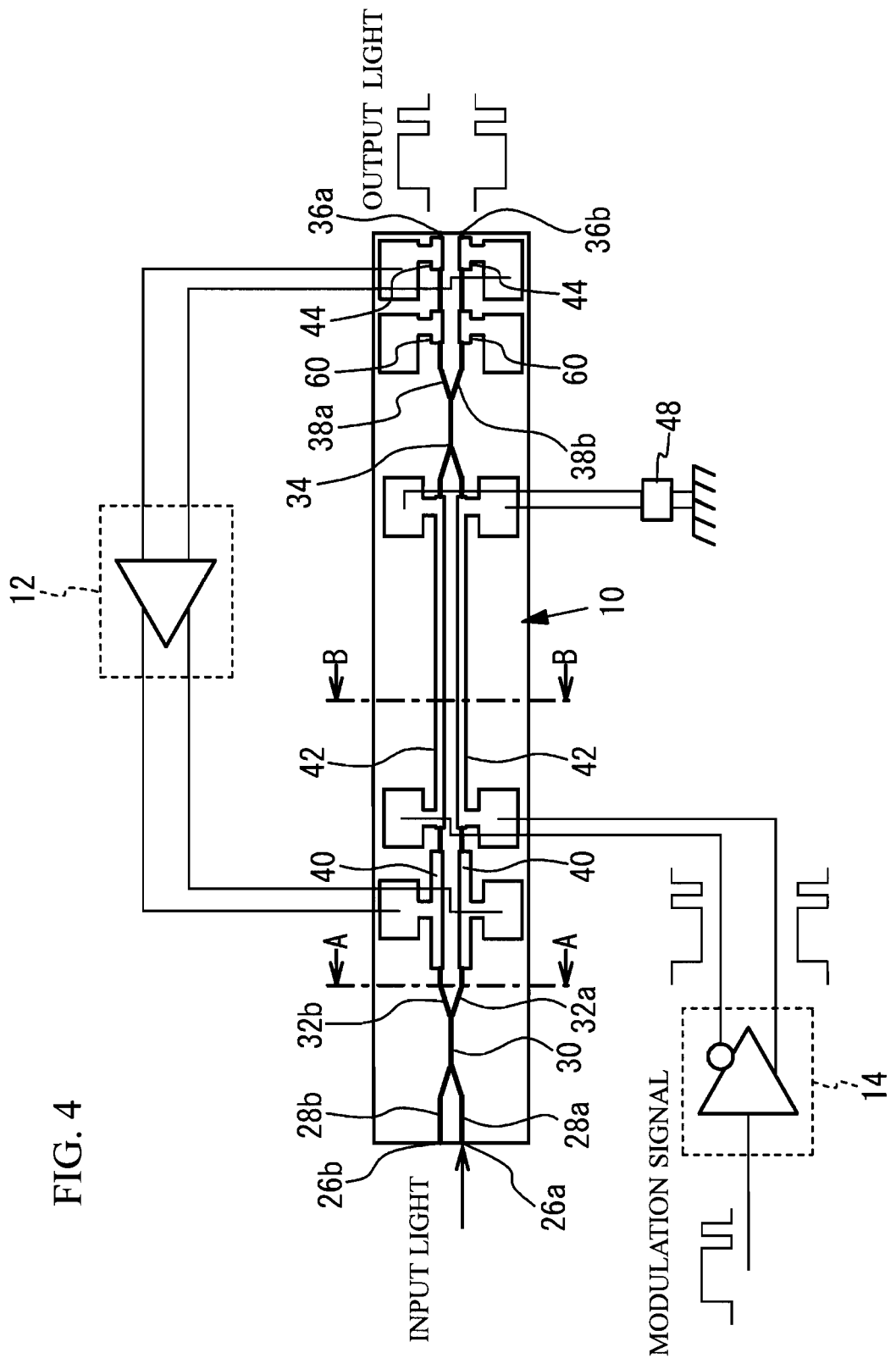
FIG. 4 is a plan view of an optical modulation apparatus in accordance with a first embodiment.

FIG. 4 is a plan view of an optical modulation apparatus in accordance with a first embodiment. In FIG. 4, parts that are the same as those used in the first comparative example (FIG. 1) are given the same reference numerals, and a description thereof is omitted here. The first embodiment is configured to have leakage suppression electrodes 60 respectively provided on the output light waveguides 38a and 38b between the second MMI 34 and the light intensity detection electrodes 44. The leakage suppression electrodes 60 may be made of the same material as the light intensity detection electrodes 44, and may be provided on contact layers on the upper cladding layer 18b (the cross section including the leakage suppression electrodes 60 is the same as illustrated in FIG. 2B). Operations of the light modulation apparatus of the first embodiment (light output switching and feedback control) are the same as those of the first comparative example.

Figure 5:
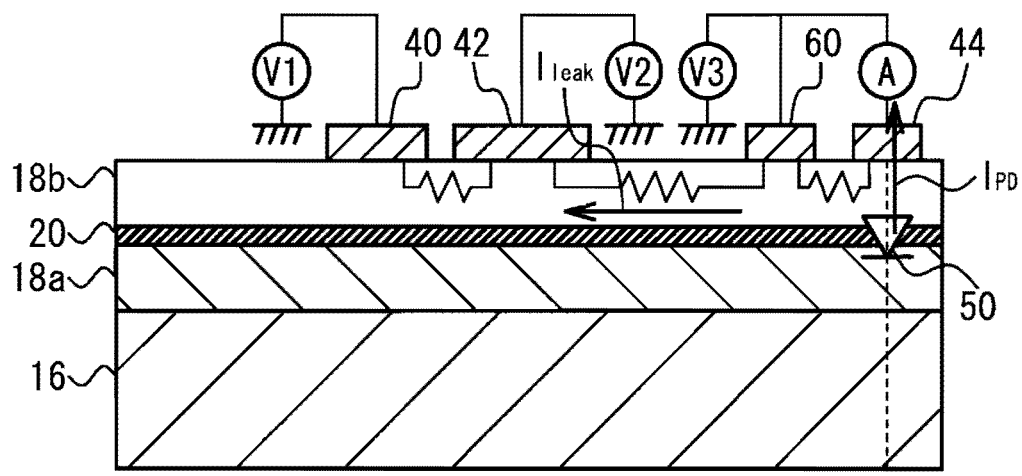
FIG. 5 is a cross-sectional view of an optical modulator in accordance with the first embodiment.

FIG. 5 is a cross-sectional view of the light modulator in accordance with the first embodiment, and corresponds to FIG. 3 of the first comparative example. The leakage suppression electrode 60 is connected to the third voltage source V3, which is also connected to the light intensity detection electrode 44, and is supplied with the third voltage V3. Therefore, the light intensity detection electrode 44 and the leakage suppression electrode 60 are substantially at the same potential, and no current flows between the electrodes 44 and 60.

According to the light modulator of the first embodiment, the leakage suppression electrodes 60 are provided between the modulation electrodes 42 and the light intensity detection electrodes 44. The leakage suppression electrodes 60 are supplied with the third voltage V3, which is also supplied to the light intensity detection electrodes 44. Thus, as illustrated in FIG. 5, the leakage current $I_{leak}$ may flow through the upper cladding layer 18b between the modulation electrode 42 and the leakage suppression electrode 60. In contrast, no leakage current flows between the leakage suppression electrode 60 and the light intensity detection electrode 44. It is therefore possible to suppress a measurement error of the ammeter A resulting from the leakage current Ileak and to accurately measure the current $I_{PD}$ for detection of the light intensity. As a result, it is possible to perform the feedback control for the phase adjustment accurately.

The optical modulator of the first embodiment is configured to connect the leakage suppression electrodes 60 to the voltage source (third voltage source V3) to which the light intensity detection electrodes 44 are connected. This arrangement may be varied so that the leakage suppression electrodes 60 and the light intensity detection electrodes 44 are supplied with separate voltages. In this variation, it is preferable that the voltage applied to the leakage suppression electrodes 60 may be an intermediate voltage between the third voltage V3 and a specific one of the first voltage V1 supplied to the phase adjustment electrodes 40 and the second voltage V2 supplied to the modulation electrodes 42, wherein the difference between the specific one of the first voltage V1 and the second voltage V2 and the third voltage V3 is larger than the difference between the other one of V1 and V2 and the third voltage V3. That is, it is preferable that the voltage applied to the leakage suppression electrodes 60 satisfies at least one of an intermediate voltage between the first voltage V1 and the third voltage V3 and an intermediate voltage between the second voltage V2 and the third voltage V3. It is thus possible to reduce the potential difference between each of the phase adjustment electrodes 40 and the modulation electrodes 42 and the light intensity detection electrodes 44 and to reduce the leakage currents from the light intensity detection electrodes 44.

The voltage applied to the leakage suppression electrodes 60 may be higher than the third voltage V3 applied to the light intensity detection electrodes 44. For example, when the third voltage V3 is −1 V, a ground potential (0 V) may be applied to the leakage suppression electrodes 60. Even in this case, it is possible to reduce the leakage currents flowing to the light intensity detection electrodes 44 from the phase adjustment electrodes 40 and the modulation electrodes 42.

In order to suppress the leakage currents most effectively, it is preferable that the same voltages are applied to the light intensity detection electrodes 44 and the light intensity detection electrodes 44. For example, a single voltage source is connected to the light intensity detection electrodes 44 and the leakage suppression electrodes 60, which are thus supplied with the same voltages.

Second Embodiment

A second embodiment has an exemplary structure in which the leakage currents are arranged in positions different from those in the first embodiment.

Figure 6:
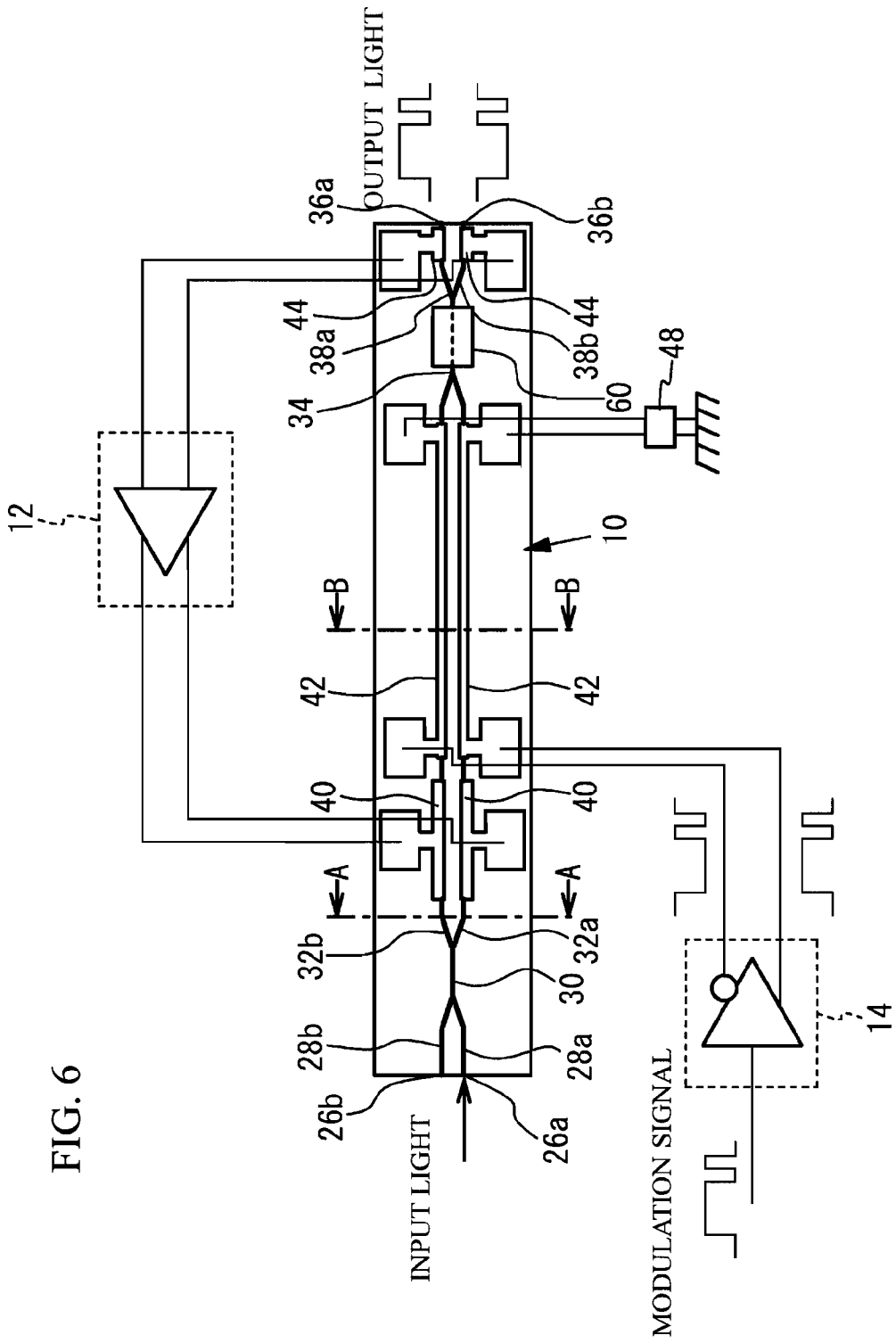
FIG. 6 is a plan view of an optical modulator in accordance with a second embodiment.

FIG. 6 is a plan view of a light modulation apparatus in accordance with the second embodiment. The leakage suppression electrode 60 is provided on the second MMI 34, which is a join-and-branch portion. The other structures of the second embodiment are the same as those of the first embodiment, and a detailed description thereof is omitted here. Like the first embodiment, the second embodiment is capable of suppressing the leakage current from the leakage suppression electrode 60 and to accurately measure the current $I_{PD}$ for detection of the light intensity.

According to the second embodiment, the leakage suppression electrode 60 is not provided to each of the two output light waveguides 38a and 38b but is provided to the second MMI 34 in which the two waveguides are joined together. It is thus possible to reduce the number of wiring lines. Preferably, the width of the leakage suppression electrode 60 is larger than the waveguide width of the second MMI 34.

As described above, the leakage suppression electrode or electrodes 60 are provided between the modulation electrodes 42 and the light intensity detection electrodes 44. In the first embodiment, the leakage suppression electrodes 60 are respectively provided on the output light waveguides 38a and 38b. In the second embodiment, the leakage suppression electrode 60 is provided on the second MMI 34. The leakage suppression electrodes 60 may be provided on the light waveguides 32a and 32b so as to follow the modulation electrodes 42. The positional relationship between the phase adjustment electrodes 40 and the modulation electrodes 42 are not limited to the positional relationships of the first and second embodiments, but may have an arrangement in which the phase adjustment electrodes 40 follow the modulation electrodes 42.

In order to suppress a light absorption that takes place in the light waveguide(s) below the leakage suppression electrode(s) 60, it is preferable the length of the leakage suppression electrode(s) 60 in the waveguide direction is small significantly. For example, it is preferable that the length of the leakage suppression electrode(s) 60 is smaller than the length of the light intensity detection electrodes 44. It is much preferable that the length of the leakage suppression electrode(s) 60 is smaller than half the length of the light intensity detection electrodes 44. In each embodiment, the second MMI 34 functions as a join-and-branch portion.

Next, a description will be given of an optical modulation apparatus according to a second comparative example.

Figures 7A, 7B:
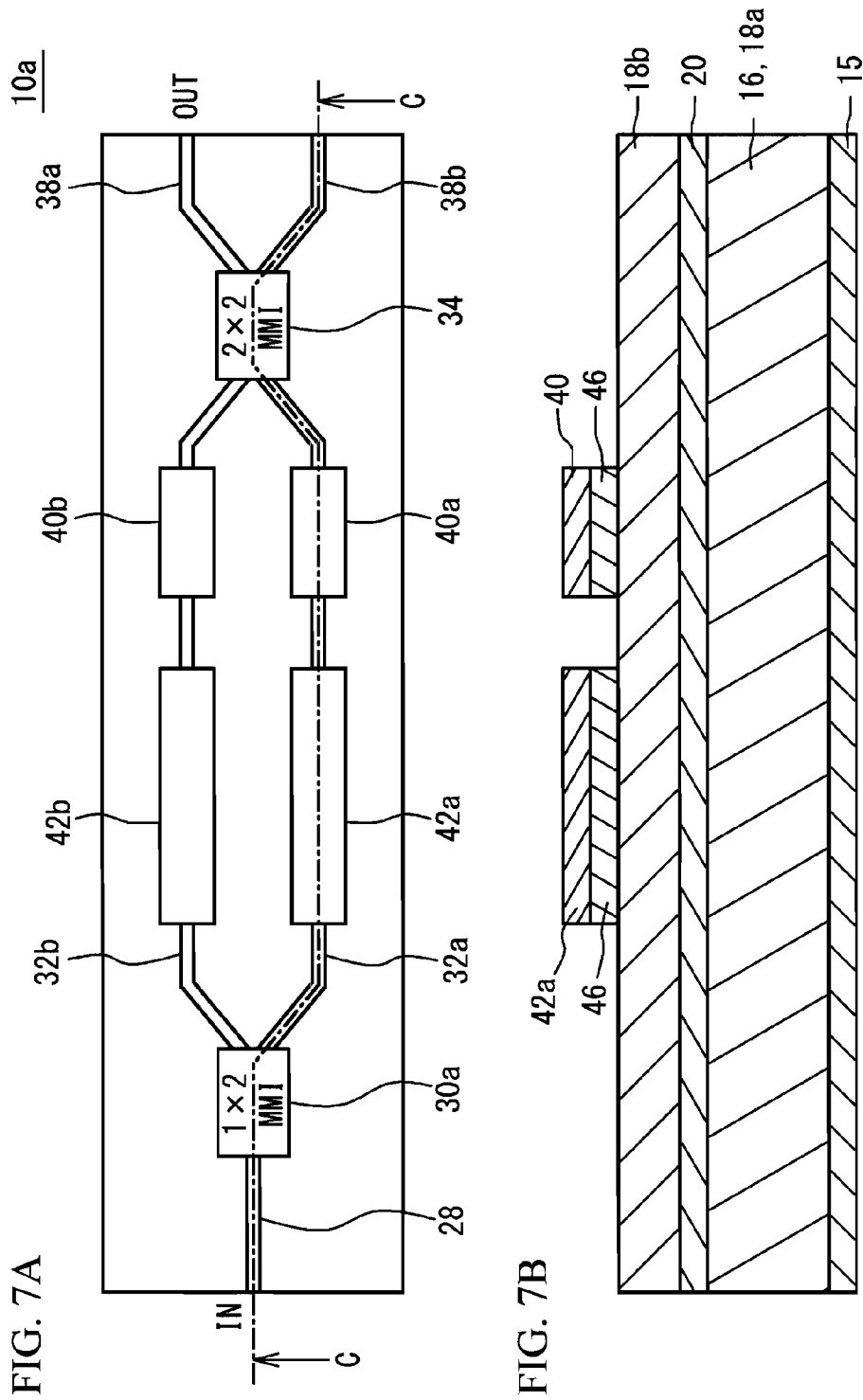
FIG. 7A is a plan view of a Mach-Zehnder optical modulator 10a according to a second comparative example.
FIG. 7B is a cross sectional view taken along a line C-C of FIG. 7A.

FIG. 7A is a plan view of a Mach-Zehnder optical modulator 10a according to the second comparative example. FIG. 7B is a cross sectional view taken along a line C-C of FIG. 7A. As illustrated in FIG. 7A, the Mach-Zehnder optical modulator 10a is different from the Mach-Zehnder optical modulator 10 of FIG. 1 in a point that the input light waveguide 28 branches to the first light waveguide 32a and the second light waveguide 32b at a first MMI 30a. The first MMI 30a is a 1×2 MMI. In FIG. 7A, a modulation electrode and a phase adjustment electrode on the first light waveguide 32a are referred to as a modulation electrode 42a and a phase adjustment electrode 40a. A modulation electrode and a phase adjustment electrode on the second light waveguide 32b are referred to as a modulation electrode 42b and a phase adjustment electrode 40b. In comparison with FIG. 1, the positions of the modulation electrode and the phase adjust electrode are reversed. However, the position is not limited. As illustrated in FIG. 7B, the light waveguide of the Mach-Zehnder optical modulator 10a has the same cross section structure as the Mach-Zehnder optical modulator 10 of FIG. 1. In FIG. 7B, the insulating film 24 is omitted, and a lower electrode 15 on a lower face of the semiconductor substrate 16 is illustrated.

Figure 8:
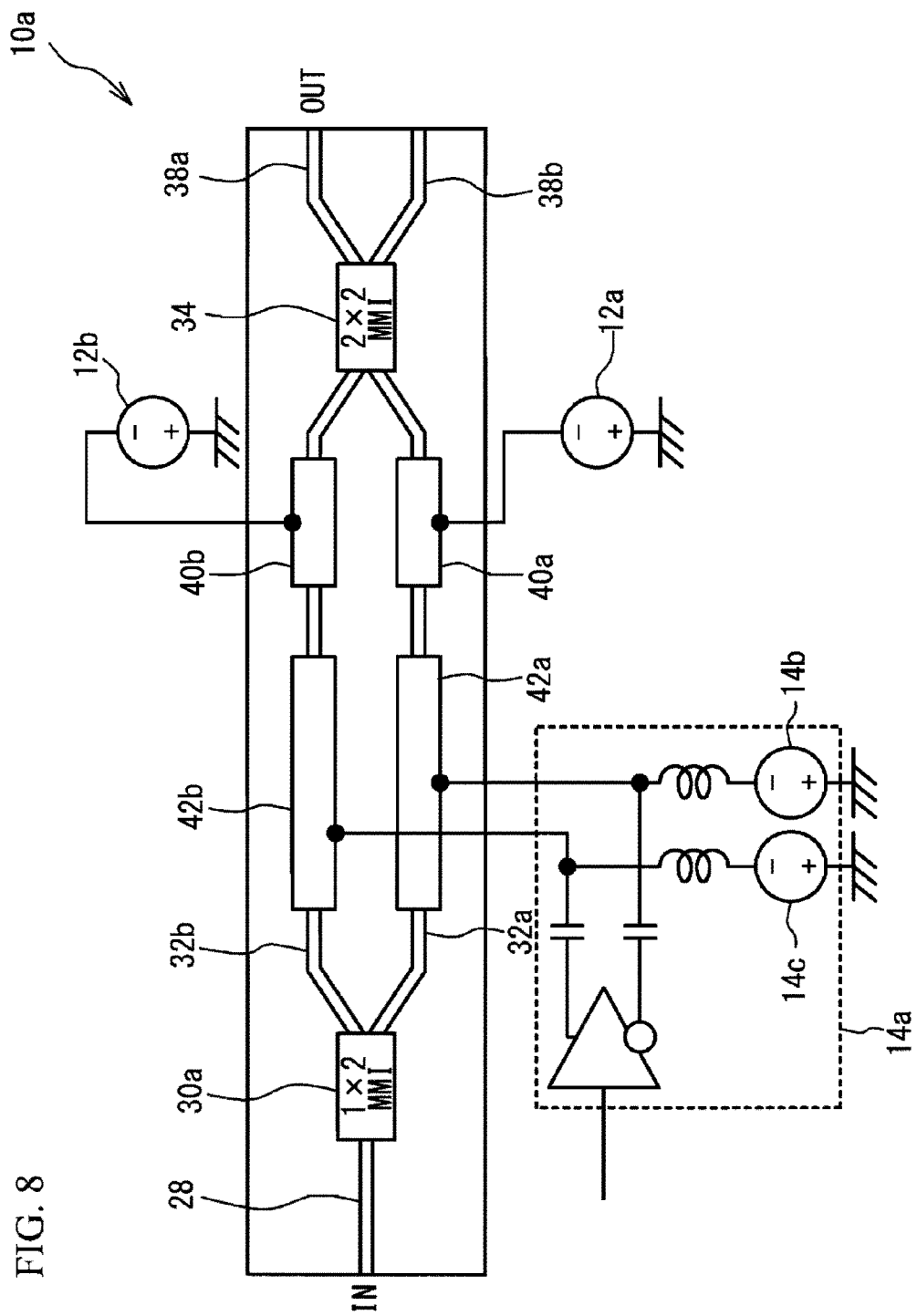
FIG. 8 is a structure example of an optical modulation apparatus according to the second comparative example.

FIG. 8 is a structure example of an optical modulation apparatus according to the second comparative example. As illustrated in FIG. 8, the optical modulation apparatus according to the second comparative example includes the Mach-Zehnder optical modulator 10a, a phase adjustment circuit 12a that applies a DC voltage to the phase adjustment electrode 40a, a phase adjustment circuit 12b that applies a DC voltage to the phase adjustment electrode 40b, and a drive circuit 14a that provides differential signals to the modulation electrodes 42a and 42b. The drive circuit 14a includes a bias circuit 14b that applies a DC voltage to the modulation electrode 42a and a bias circuit 14c that applies a DC voltage to the modulation electrode 42b. At least one of the phase adjustment circuits 12a and 12b has only to be provided.

Figure 9:
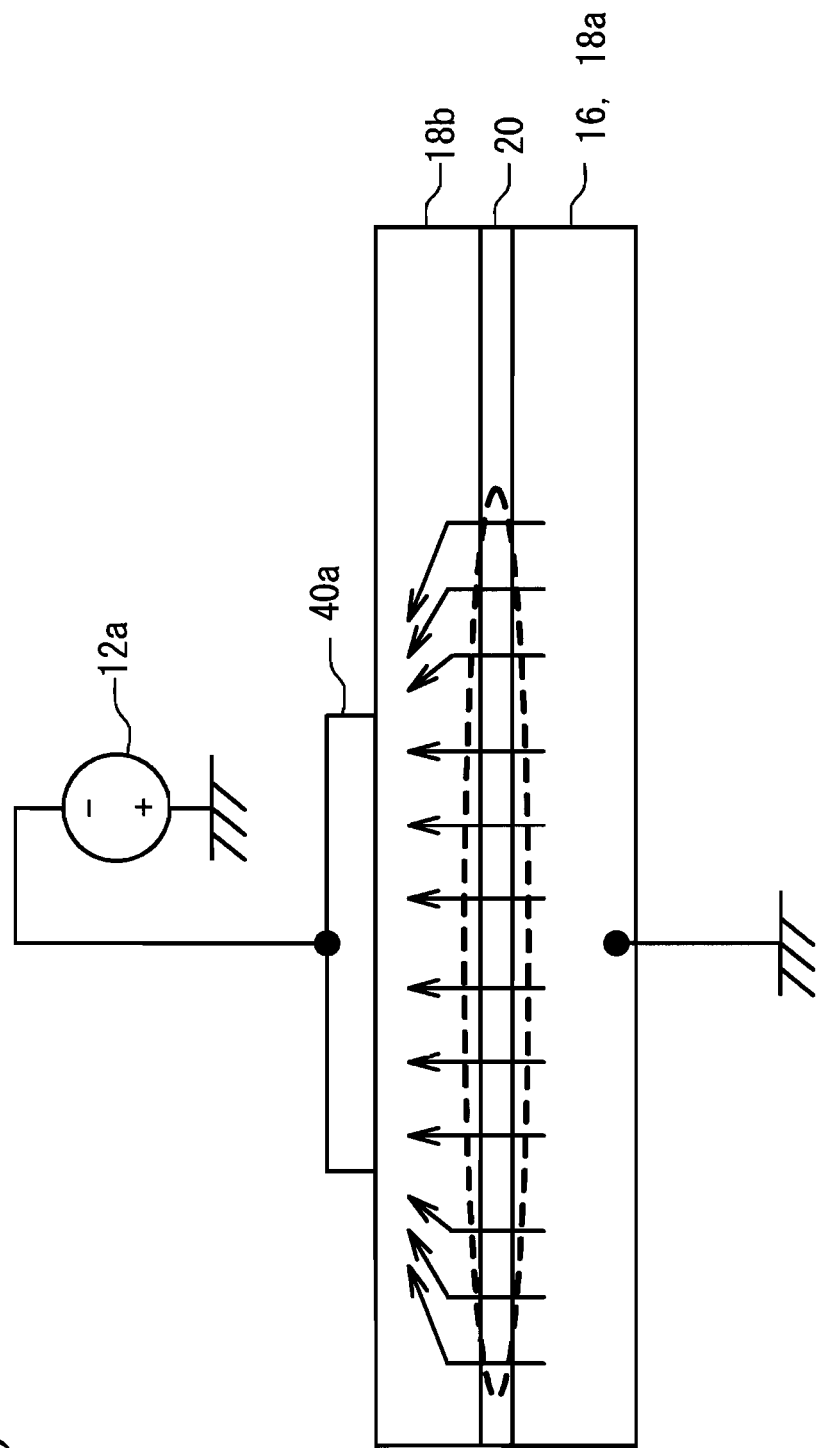
FIG. 9 illustrates an applying of electrical field.

For example, the upper cladding layer 18b is made of a p-type semiconductor that has resistance of a few hundreds of kilo ohm per mm. When the upper cladding layer 18b has relatively low resistance as described above, electrical field is leaked to a part of the core 20 that is out of another part of the core 20 below the modulation electrode or the phase adjustment electrode as illustrated in FIG. 9. Therefore, when different biases are applied to arm electrodes adjacent to each other, the two biases interfere with each other. Therefore, an operating point of the Mach-Zehnder optical modulator may be shifted. In FIG. 9, as an example, vicinity of the phase adjustment electrode 40a is illustrated.

On the other hand, the above-mentioned resistance is not extremely small. When a high frequency wave signal is applied to the modulation electrode, an amount of the leaked electrical field gets smaller. Therefore, a frequency dependency of frequency occurs in the electrical field applied to the core 20. In concrete, the lower the frequency is, the larger the expansion of the electrical field is. In this case, a phase changing amount gets larger. Therefore, when frequency response characteristic of the Mach-Zehnder optical modulator 10a is measured, it may be observed that the frequency characteristic is enhanced on the low frequency side. That is, when an output waveguide is measured, a response of which time constant is very long may be observed. And so, an optical modulation apparatus that is capable of suppressing bias interference between adjacent electrodes or suppressing frequency characteristic will be given in a third embodiment.

Third Embodiment

Figure 10A:
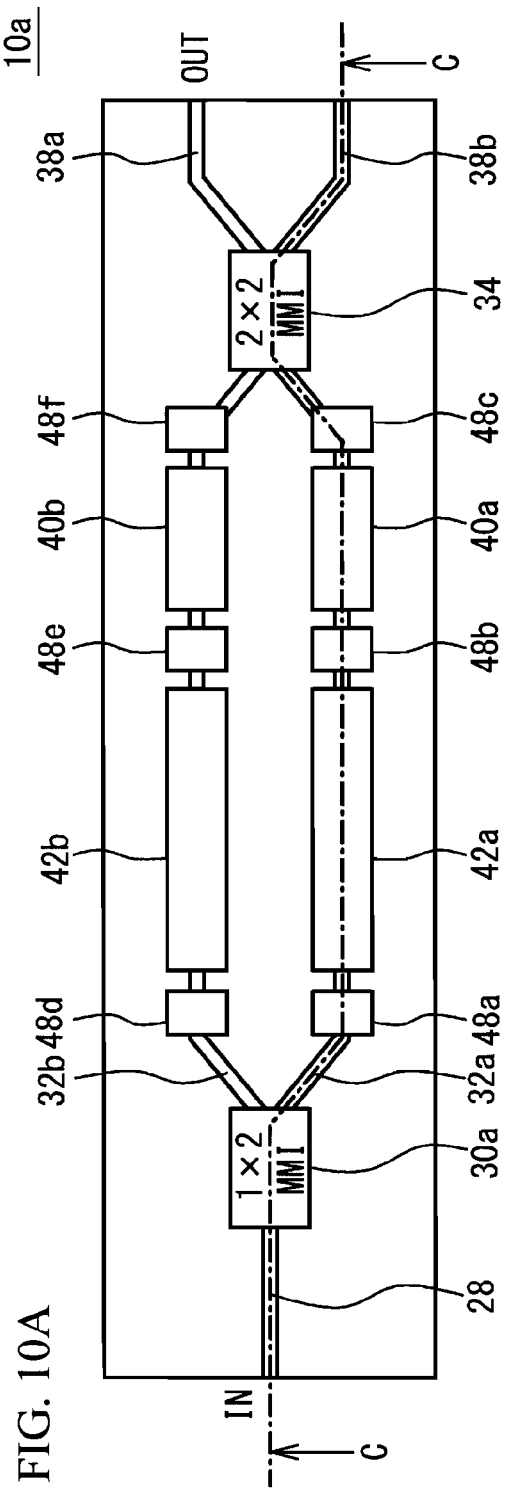
FIG. 10A is a plan view of an optical modulation apparatus according to a third embodiment.
Figure 10B:
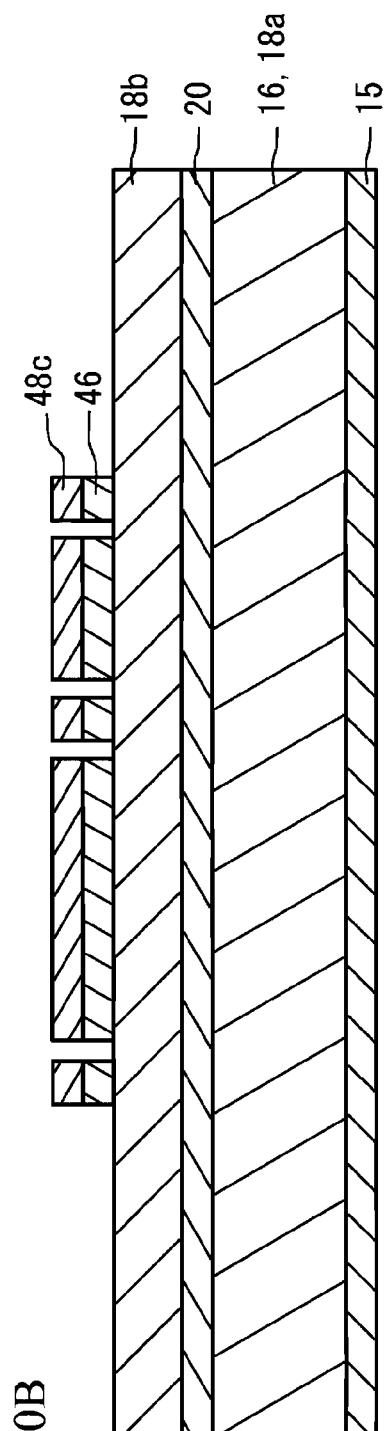
FIG. 10B is a cross sectional view taken along a line C-C of FIG. 10A.

FIG. 10A is a plan view of an optical modulation apparatus according to the third embodiment. FIG. 10B is a cross sectional view taken along a line C-C of FIG. 10A. In FIG. 10A, parts that are the same as those used in the second comparative example (FIG. 7) are given the same reference numerals, and a description thereof is omitted here. In the third embodiment, an isolation electrode that is grounded is provided on the both edge of the modulation electrode and the phase adjustment electrode and is spaced from the modulation electrode and the phase adjustment electrode, along the light waveguide.

Along the first light waveguide 32a, an isolation electrode on the input side with respect to the modulation electrode 42a is referred to as an isolation electrode 48a. An isolation electrode between the modulation electrode 42a and the phase adjustment electrode 40a is referred to as an isolation electrode 48b. An isolation electrode on the output side with respect to the phase adjustment electrode 40a is referred to as an isolation electrode 48c. Along the second light waveguide 32b, an isolation electrode on the input side with respect to the modulation electrode 42b is referred to as an isolation electrode 48d. An isolation electrode between the modulation electrode 42b and the phase adjustment electrode 40b is referred to as an isolation electrode 48e. An isolation electrode on the output side with respect to the phase adjustment electrode 40b is referred to as an isolation electrode 48f.

Figure 11:
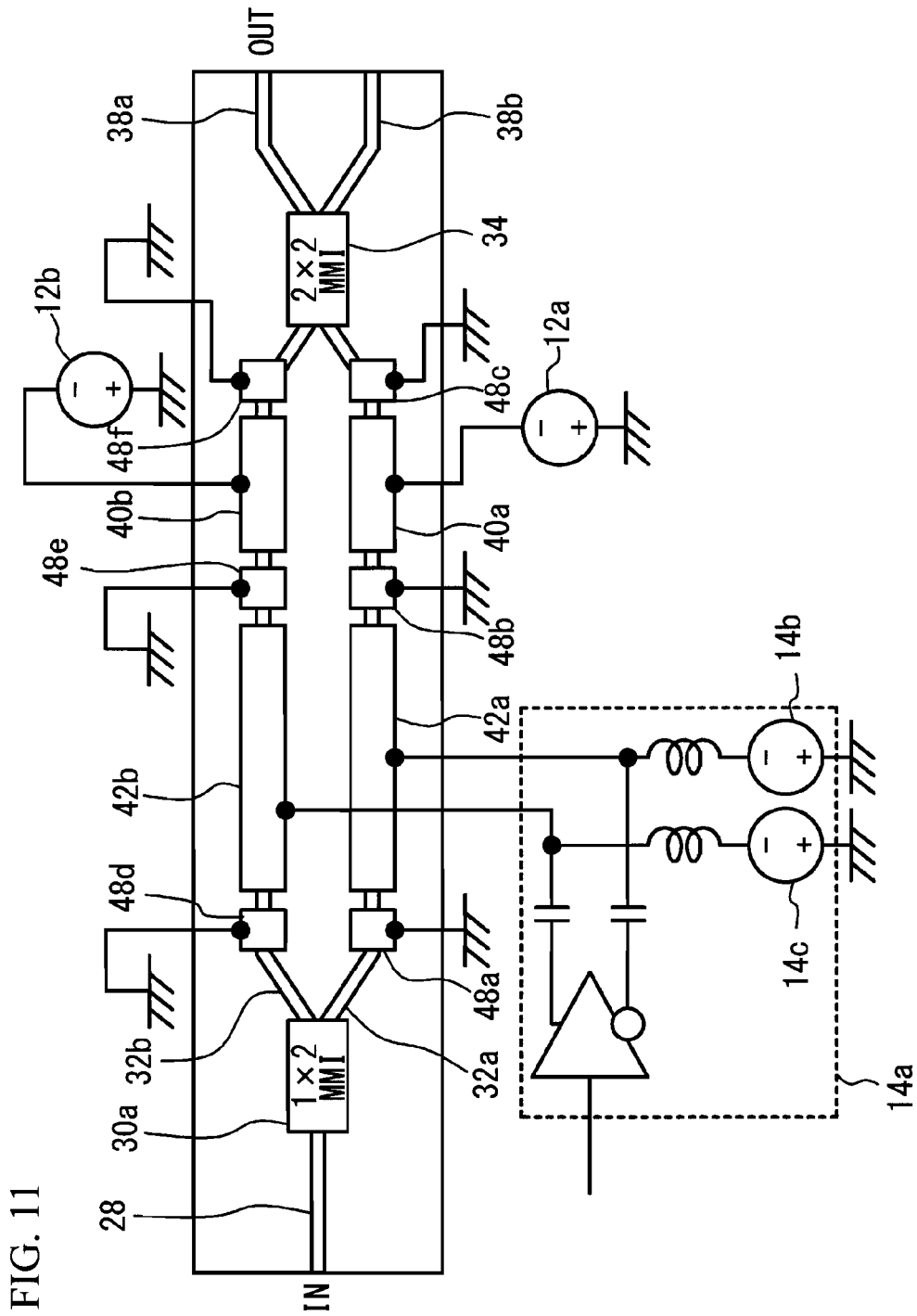
FIG. 11 is a structure example of an optical modulation apparatus according to a third embodiment.
Figure 12:
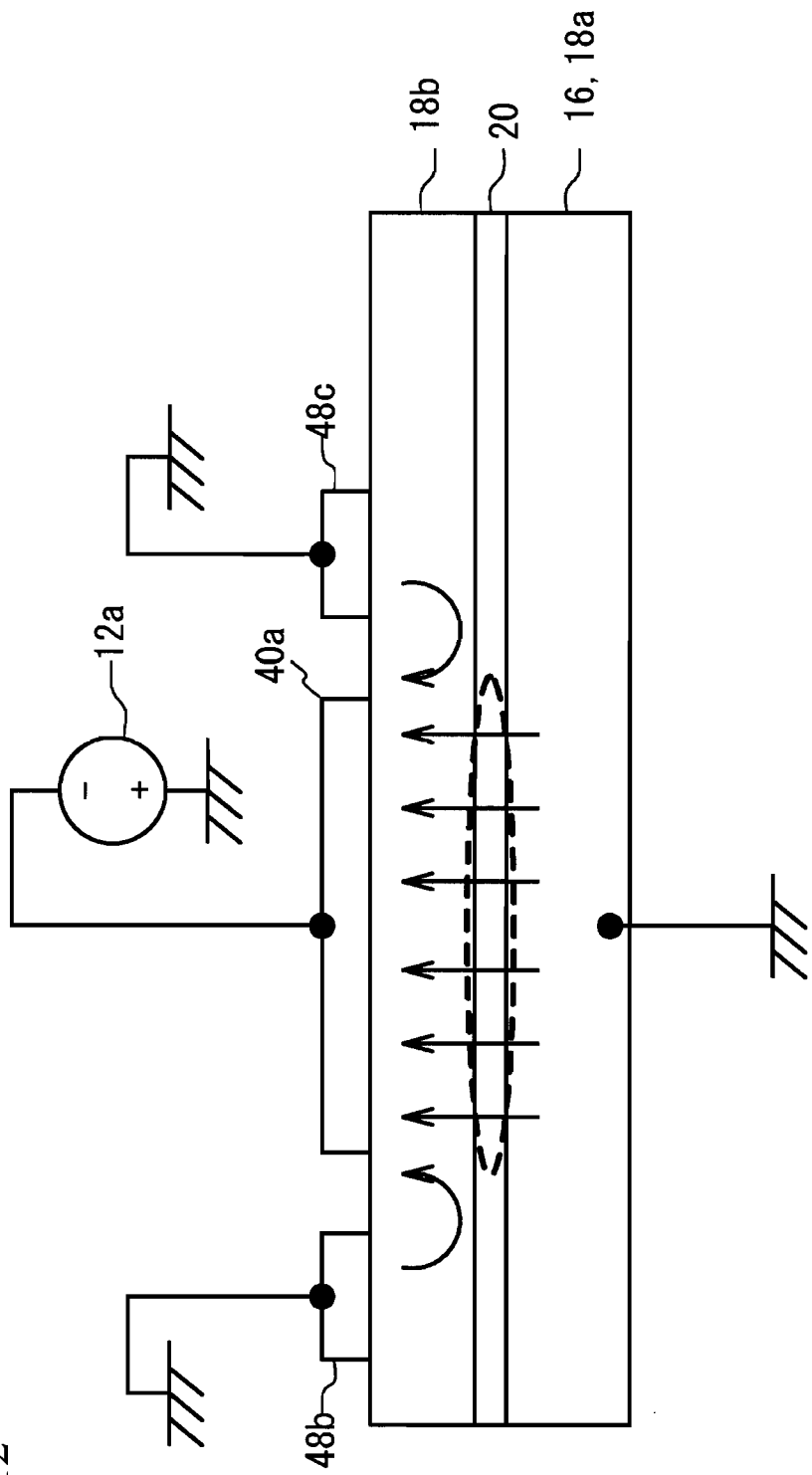
FIG. 12 illustrates an applying of electrical field.

As illustrated in FIG. 11, the isolation electrodes 48a to 48f are grounded. As illustrated in FIG. 12, when the isolation electrodes 48a to 48f are grounded, the leakage of the electrical field in the core 20 is suppressed. When the isolation electrode is located near the modulation electrode or the phase adjustment electrode, the leakage of the electrical field is suppressed. On the other hand, when the isolation electrode is located near the modulation electrode or the phase adjustment electrode, an amount of a leakage current flowing in the upper cladding layer 18b gets larger. And so, when a distance between the isolation electrode and the modulation electrode or the phase adjustment electrode is 50 µm to 150 µm, the leakage of the electrical field is suppressed and the amount of the leakage current is effectively suppressed. In FIG. 12, vicinity of the phase adjustment electrode 40a is illustrated.

A location example of the isolation electrode is not limited to FIG. 11. A grounded isolation electrode has only to be provided at least one of edges of an arm electrode and spaced from the arm electrode along a light waveguide in a Mach-Zehnder optical modulator.

Figure 13:
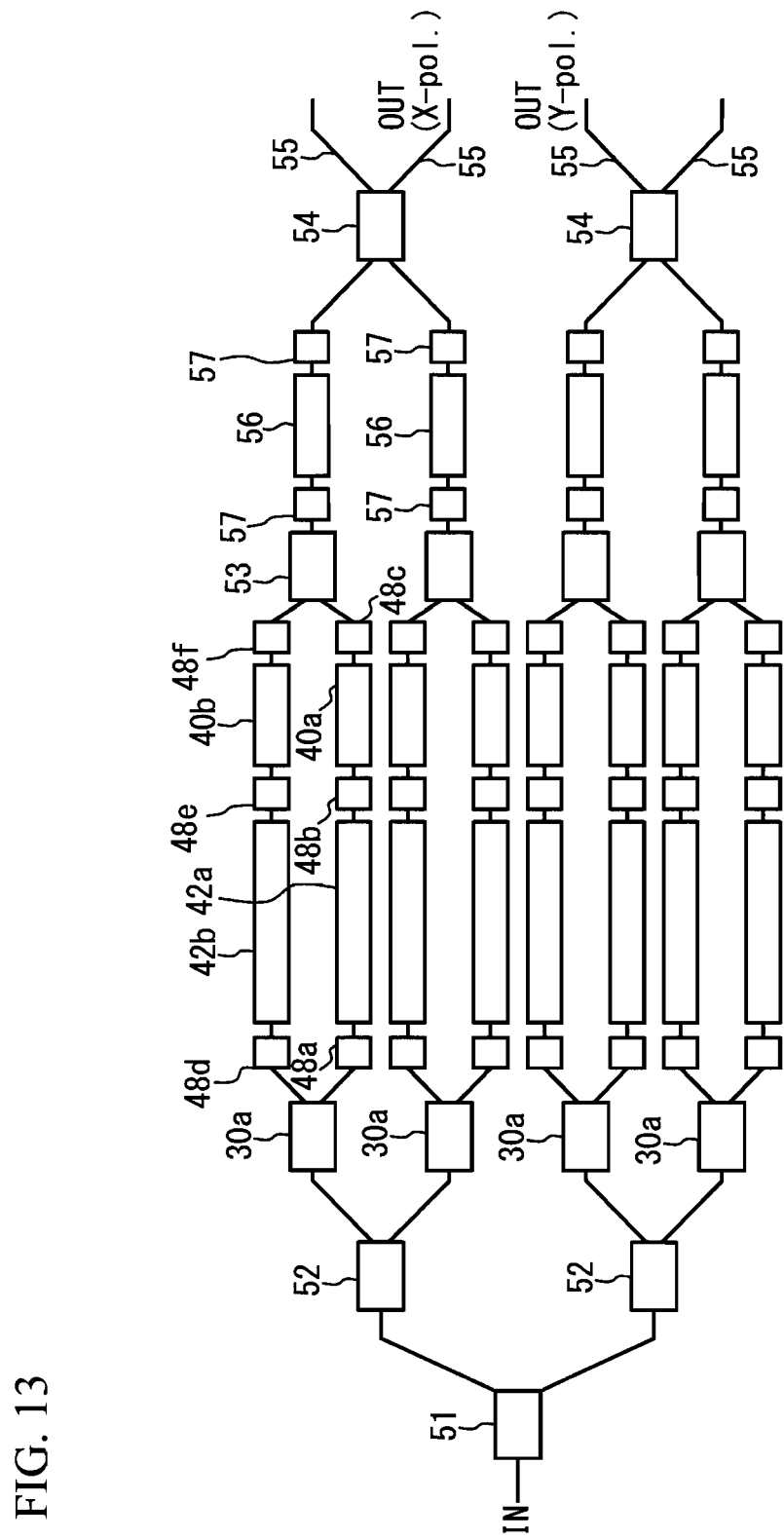
FIG. 13 is another example of the optical modulation apparatus according to the third embodiment.

FIG. 13 is another example of the optical modulation apparatus according to the third embodiment. In an example of FIG. 13, a DP-QPSK modulation apparatus having four Mach-Zehnder optical modulators is illustrated. A 1×2 MMI 51 is connected to an input light waveguide. Two output light waveguides of the MMI 51 are connected to two 1×2 MMIs 52. Output light waveguides of the two MMIs 52 are connected to the first MMIs 30a of the four Mach-Zehnder optical modulators.

In the example of FIG. 13, a 2×1 MMI 53 is provided instead of the 2×2 second MMI 34. Output light waveguides of the MMI 53 combine at two MMIs 54 and branch to four light waveguides 55. A phase adjustment electrode 56 is provided on an output light waveguide from the MMI 53 to the MMI 54. An isolation electrode 57 is provided on both edges of the phase adjustment electrode 56 and is spaced from the phase adjustment electrode 56 on the output optical waveguide. When the isolation electrodes 48a to 48f and the isolation electrode 57 are provided, the leakage of the electrical field is suppressed and the amount of the leakage current is suppressed.

The present invention is not limited to the specifically described embodiments and variations but other embodiments and variations may be made without departing from the scope of the claimed invention.

What is claimed is:

1. A Mach-Zehnder optical modulator comprising:
a join-and-branch portion;
two light waveguides that have a structure in which a core is sandwiched between a first conductivity type semiconductor and a second conductivity type semiconductor and are connected with the join-and-branch portion;
an output light waveguide connected with the join-and-branch portion;
arm electrodes respectively provided on the second conductivity type semiconductor of the two light waveguides;
a ground electrode that is provided on the first conductivity type semiconductor of the two light waveguides; and
isolation electrodes that are respectively provided at an edge of the arm electrodes along the light waveguide, are spaced from the arm electrodes and are grounded.

2. The Mach-Zehnder optical modulator according to claim 1, wherein the arm electrodes is a phase adjustment electrode or a modulation electrode.

3. The Mach-Zehnder optical modulator according to claim 1, wherein:
two arm electrodes are provided along one of the light waveguides; and
the isolation electrodes are provided between the two arm electrodes and are spaced from the two arm electrodes.

4. The Mach-Zehnder optical modulator according to claim 1, wherein a distance between the isolation electrodes and the arm electrodes is 50 µm to 150 µm.

* * * * *